United States Patent [19]

Nielson et al.

[11] 4,438,609
[45] Mar. 27, 1984

[54] URETHANE BONDED WINDSHIELD DAM

[75] Inventors: Erik I. Nielson, Oakville; Robert B. Hope, Downsview, both of Canada

[73] Assignee: Schlegel Corporation, Rochester, N.Y.

[21] Appl. No.: 229,848

[22] Filed: Jan. 30, 1981

[51] Int. Cl.³ .......................... E06B 3/62; E06B 7/16
[52] U.S. Cl. ...................................... 52/208; 52/400; 52/716
[58] Field of Search .......... 52/208, 397, 398, 400–402, 52/716–718, 741; 49/441, 491, 490, 492–494; 296/93

[56] References Cited

U.S. PATENT DOCUMENTS

| | | |
|---|---|---|
| 1,706,597 | 3/1929 | Anderson . |
| 3,150,421 | 9/1964 | Lickert ............................. 52/208 |
| 3,155,422 | 11/1964 | Campbell et al. ............... 52/208 |
| 3,198,689 | 8/1965 | Lansing . |
| 3,742,649 | 4/1973 | Dochnahl ........................ 52/397 |
| 3,788,008 | 1/1974 | Yackiw et al. . |
| 3,851,433 | 12/1974 | Colucci . |
| 3,908,312 | 9/1975 | Pennec ............................ 49/496 |
| 3,931,699 | 1/1976 | Sarvay . |
| 3,955,331 | 5/1976 | Williams . |
| 4,001,994 | 1/1977 | Williams et al. . |
| 4,035,017 | 4/1977 | Griffin et al. .................... 296/93 |
| 4,123,100 | 10/1978 | Ellis ................................. 49/490 |
| 4,147,006 | 4/1979 | Kruschwitz ..................... 52/401 |
| 4,165,119 | 8/1979 | Hedeen et al. .................. 52/400 |
| 4,347,693 | 9/1982 | Kruschwitz ..................... 52/208 |

FOREIGN PATENT DOCUMENTS

| | | |
|---|---|---|
| 1801148 | 4/1970 | Fed. Rep. of Germany ........ 52/400 |
| 8123350 | 1/1982 | Fed. Rep. of Germany . |
| 1364754 | 5/1964 | France ............................. 49/490 |
| 521440 | 3/1955 | Italy ................................. 49/491 |
| 293194 | 7/1928 | United Kingdom . |
| 2049010 | 12/1980 | United Kingdom ............. 52/400 |
| 2086464 | 5/1982 | United Kingdom . |

Primary Examiner—John E. Murtagh
Assistant Examiner—Richard E. Chilcot, Jr.
Attorney, Agent, or Firm—Cushman, Darby & Cushman

[57] ABSTRACT

This invention relates to an improved one-piece window trim and adhesive dam structure that is provided with sealing means for effectively sealing the window when the latter is installed in vehicles without the necessity of having separate sealing elements secured to the window itself prior to its installation. The present invention also relates to an improved process for installing such windows.

12 Claims, 11 Drawing Figures

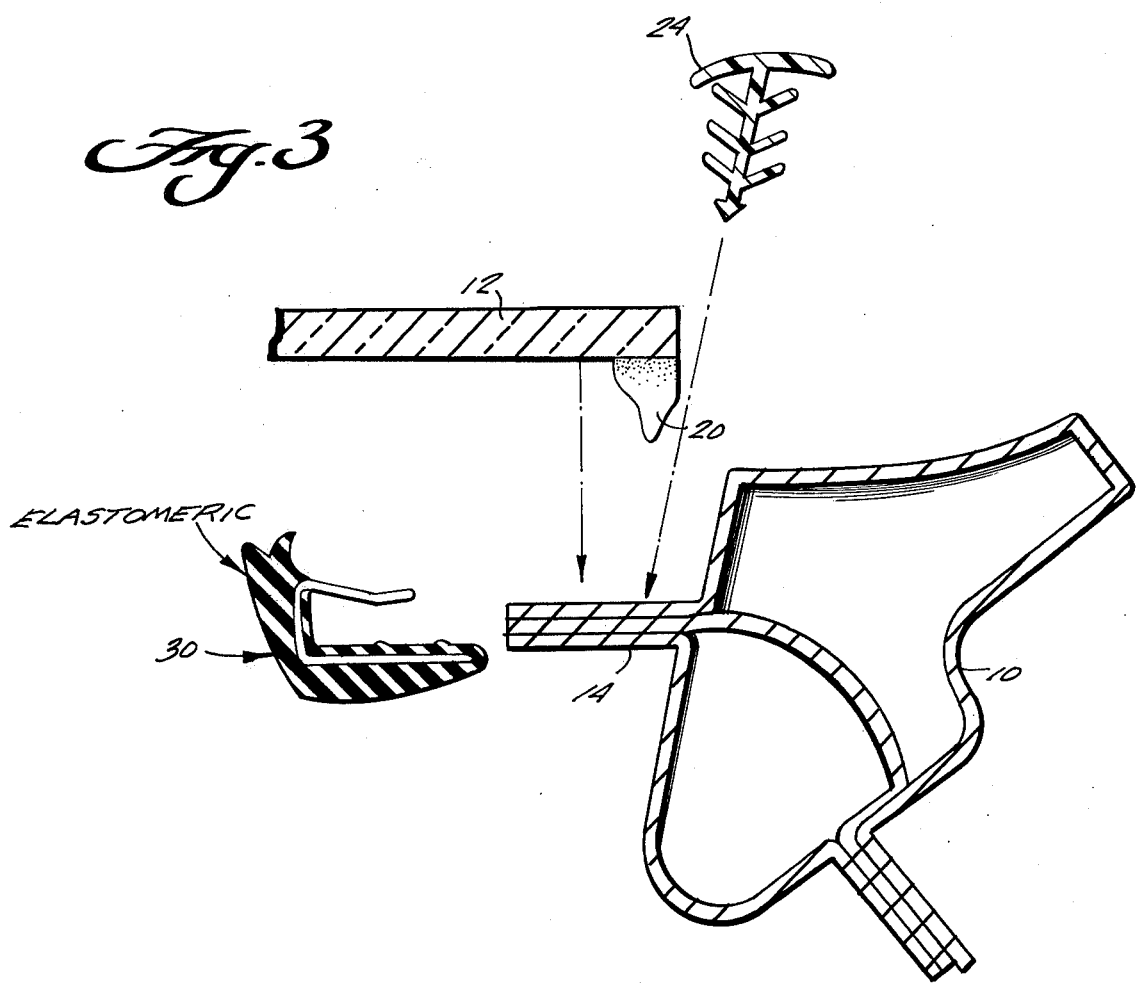
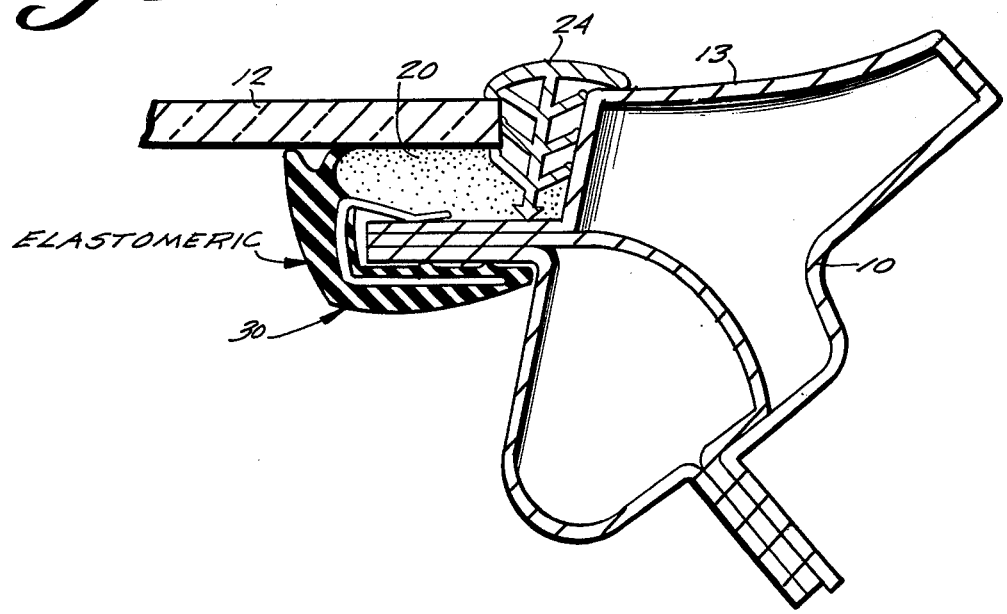

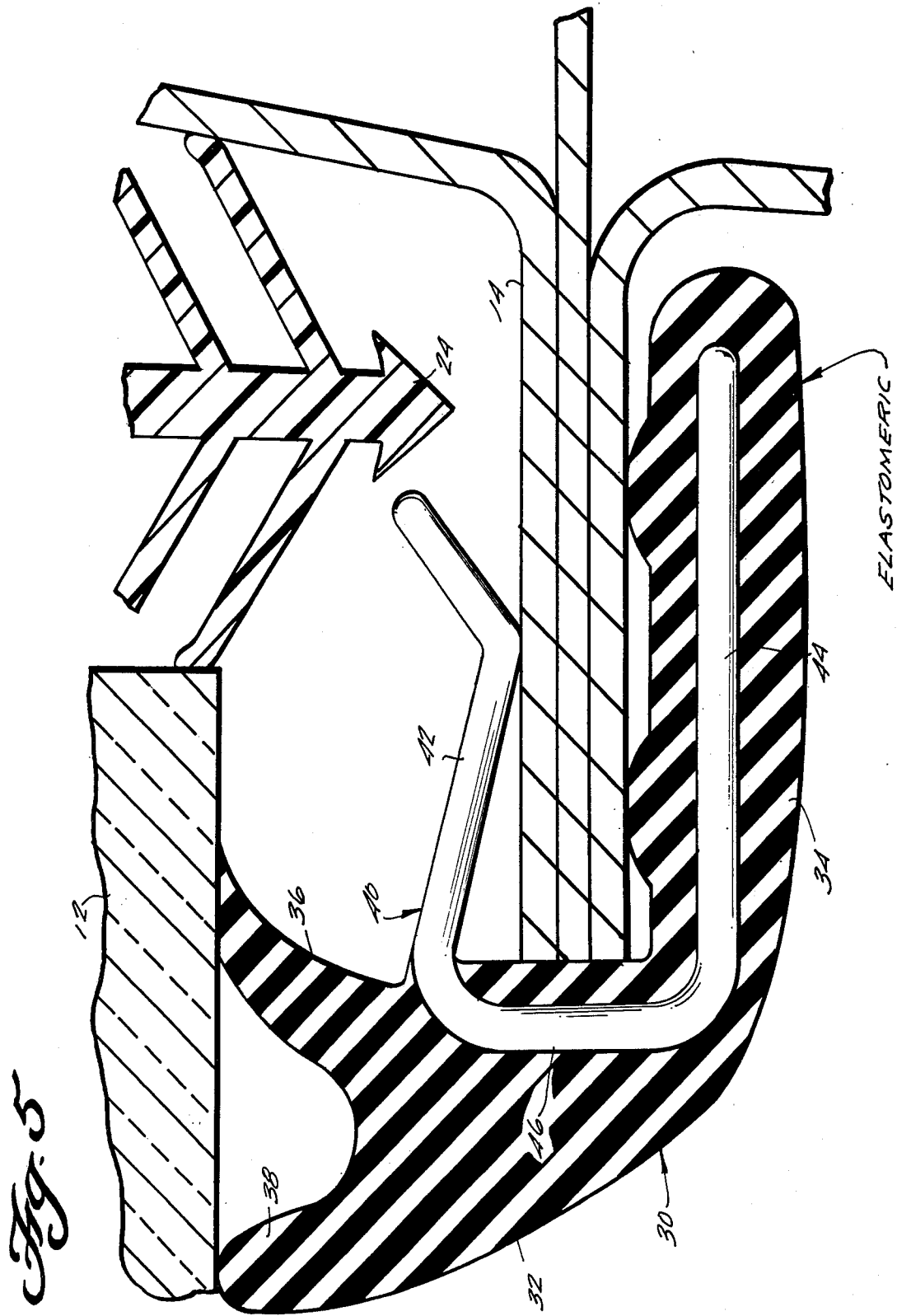

URETHANE BONDED WINDSHIELD DAM

BACKGROUND OF THE PRESENT INVENTION

Over the years there have been a number of procedures and types of trim elements used to install windows into vehicles so that the window would be both securely fastened in place and at the same time fully sealed to prevent water leakage. These procedures have evolved into one employing trim elements that fit around the periphery of the window and an adhesive type sealing compound, in order to help effect a very tight and permanent seal. While procedures vary, the adhesive or mastik compound is either placed in the body cavity designed to receive the window or as is more usually the case directly onto the window itself. The trim elements used hopefully to help align the window within the body cavity, do become part of the means securing the window in place. Traditionally, the body cavity is provided with a flange or some member extending around the body cavity onto which at least one trim element can be fastened by using a wire embedded in the trim and bent to grip the flange. A chamber is formed between the body cavity, the window and the trim elements and the sealing compound will hopefully flow throughout that cavity and through the wire structure part of which is usually in the form of an open grid.

When the trim elements and adhesive are properly positioned and the window is pressed into the body cavity, the adhesive compound will flow throughout the chamber and through the exposed open grid of wire and will bond together the trim structures and body flange exposed therein to produce a water tight seal around the marginal edge of the window.

It is of course desirable, if not necessary, to control the flow path of this adhesive material as the window is being pressed into the body cavity and the adhesives flowing. Toward that end the trim elements employed include some means to prevent the adhesive compound from flowing out of the chamber formed between the window and the body cavity, especially out onto the glass and the exterior of the trim.

One known trim structure in current use is shown in FIGS. 1 and 2. The molding in this known structure is comprised of a plurality of separate elements. These include a continuous elongated trim member secured to a flange within the body cavity in which the window will be received. This trim member, in part, serves to define part of the chamber on one side of the marginal edge of the window. A separate dam member, secured to the window by a separate process prior to the window's installation, cooperates with the interior of the trim member to prevent adhesive material from flowing onto the window during installation. The structure also includes an exterior trim, referred to as Christmas tree trim, which has an interior end structure exposed within the chamber formed between the window and the body cavity.

When the windshield is installed, the adhesive is forced throughout the void or chamber between the marginal edge of the window, the body cavity and the trim elements and flows into and around the exposed portions of each trim element and also onto the windshield and portions of the body cavity which are likewise exposed within the chamber. The function of the separate dam member is to prevent the flowing adhesive from getting out of the chamber and onto the exterior of the trim member or onto the glass beyond the trim.

The typical assembly procedure for this known prior art device is initiated by precoating the body flange with an urethane primer and thereafter mounting the windshield trim onto the flange provided on the vehicle body. The separate dam is adhesively bonded to the windshield at what is hoped to be the correct predetermined distance away from the marginal edge of the window. After the adhesive material is applied either to the vehicle body or to the marginal edge of the window, the latter being the preferred practice it will be located between the window's edge and the separate dam previously applied. Thereafter, with the separate dam in place and the adhesive having been applied, the window is pushed into the body cavity on which the primary trim member has already been positioned. When the window is in place, a gap will remain between a portion of the vehicle body and the edges of the window and the Christmas tree trim material is forced into that opening to close it. The inner end of that Christmas tree trim will contact the adhesive flowing throughout the chamber between the glass and the body cavity. The separate dam member should prevent or limit flow of adhesive therepast but this will only occur if its placement on the interior surface of the windshield was correctly accomplished.

The windshield trim is reinforced with a wire structure that is folded back on itself so as to form a U-shaped clip which will hold the trim on the body cavity flange. It is preferred that the reinforcing material exposed above the flange have an opened structure so that the adhesive can flow through that open network of reinforcing material, usually wire. Likewise when the Christmas tree trim itself is pushed into the opening between the vehicle's body and the edge of the window, the leading portion of that trim member will also be pushed into the adhesive material. Thus, the adhesive will have flowed not only through the cavity formed between the window and the car body, but also through or around the various trims that enclose the exterior and interior marginal edge portions of the windshield.

Problems exist, however, in achieving the proper placement of the separate dam on the window and unless that is accurately done, problems can develop. For instance, the dam member can be positioned closer or further away from the marginal edge of the window than is desired. If the dam member is closer to the window's edge, its bottom sealing edge will engage the open reinforcing member and also the volume of the chamber for containing adhesive will be smaller. When the window is pushed into place the adhesive will have greater pressure applied to it and some may flow beneath the dam, through the open reinforcing network and possibly out beyond the main trim member.

If the dam is further away from the edge a much larger void is formed between the marginal edge of the windshield and the vehicle body so that the adhesive will not be fully forced throughout that chamber. Further, the dam itself can be exposed above the main trim and become a visual part of the interior trim along the window edge which is not desirable. By having the dam sit away from the edge a further degree, the glass will sit higher than required and will not be flush with the vehicle body portion designed to receive it; the void or chamber becomes even larger and the adhesive may not provide the same water tight seal that would otherwise be achievable. Accordingly, the exact placement of that separate dam on the window is critical to achieving both a water tight and visually attractive seal.

Also, even if the dam is positioned correctly on the window, the window may be misaligned when placed in the body cavity. Thus, the dam could, in part, become positioned interiorly of the main trim member making the dam totally ineffective in that area.

Additionally, the use of the separate dam required not only additional material, but more importantly requires the use of an additional processing step in the installation of the window, thus, adding two separate additional cost factors to the price of the vehicle itself while at the same time provide a joining technique that requires additional time and effort.

SUMMARY OF THE PRESENT INVENTION

The present invention relates to an improved windshield trim structure which is also reinforced and includes means to attach it onto a flange provided on the vehicle body. The invention, however, resides in making the sealing structure in the area that will contact the windshield in the form of integrally formed interior and exterior sealing means so that regardless of how the window is placed in the body cavity the sealing means on the trim will contact the window and correctly perform their sealing and internal trim functions. The interior portion of the sealing device replaces the separate dam member of the prior art structure and while accomplishing its objective, that of controlling the flow of the adhesive during installation of the windshield, use of a separate dam is eliminated as well as the separate processing steps previously required to secure that separate dam to the windshield. Thus, the improved sealing portion of the windshield trim produced according to the present invention not only provides an interior portion to function as a barrier to control and limit the flow of the adhesive, but because it is always correctly positioned relative to the exterior portion it allows that exterior portion to perform its function as the visible interior trim about the window and unexpectedly allows the sealing portion of the trim to act, at least in part, as a positive stop to help define the depth to which the glass or windshield is inserted into the body cavity to thereby make best use of the quantity of adhesive. Thus, the correct placement of the window is not only easier to accomplish, but problems created by the misalignment, either of the glass and/or of the dam on the glass, are effectively eliminated. We have found this to be the major advantage of the present invention to effect sealing between the windshield trim of the present invention and the smooth surface of the glass within or at the body cavity and that a far superior seal is obtained when compared with the results obtained from the prior art approach referred to above.

Also, the windshield trim of the present invention continues to be extruded, as was the case with the prior art construction, and it is made from an elastomeric material.

Thus, the present invention allows the windshield trim to be placed on the vehicle flange so that it becomes an extension of the body flange and acts as an integral part of the body which receives the glass. Thus, the sealing area is located on the body flange rather than on the marginal edge of the windshield itself.

Other objects, features, and characteristics of the present invention as well as the methods and operation and functions of the related elements of the structure, and to the combination of parts and economies of their manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The drawings used herein are as follows:

FIG. 3 is a exploded, diagrammatic view of the window assembly according to the present invention;

FIG. 4 is a final diagrammatic, final window assembly incorporating the present invention as set forth in FIG. 3;

FIG. 5 is a diagrammatic showing of a cross-section of the windshield trim as shown being used in FIGS. 3 and 4;

DETAILED DESCRIPTION OF THE PREFERRED EXEMPLARY EMBODIMENTS OF THE PRESENT INVENTION

Figure 1:
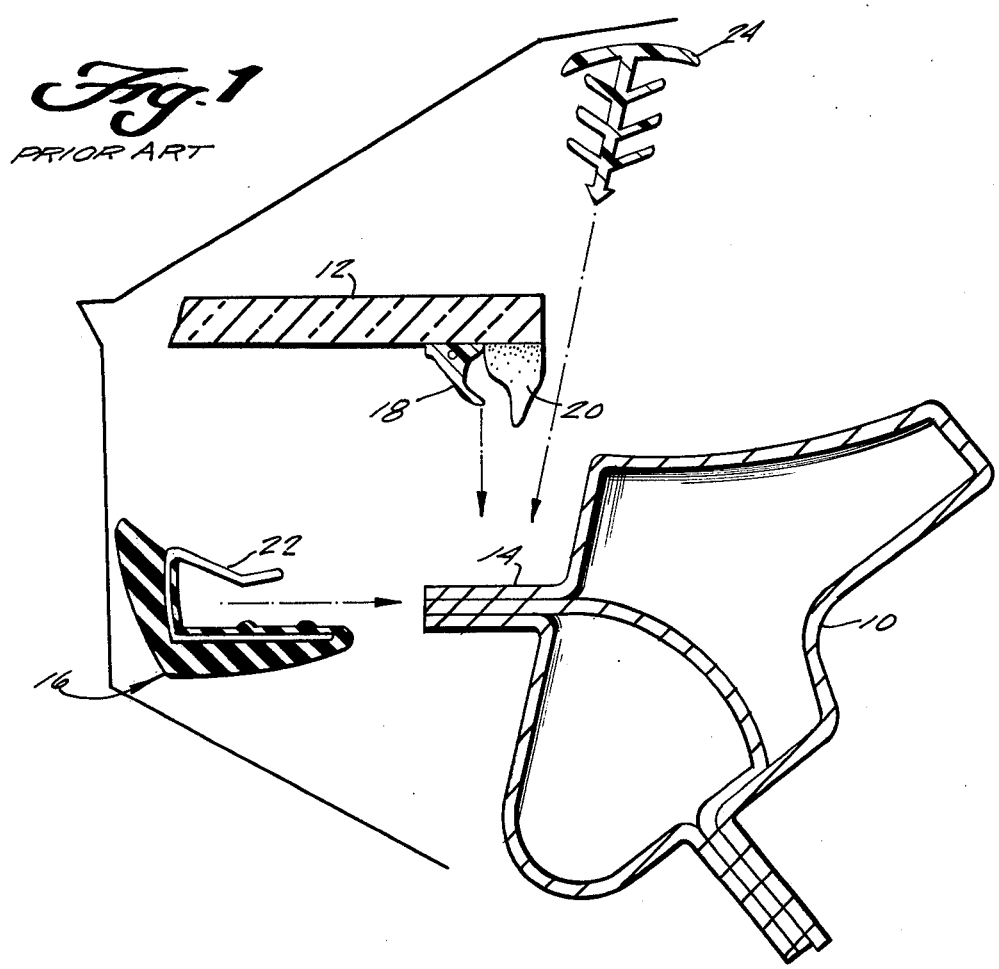
FIG. 1 is a diagrammatic, exploded view of the prior art window assembly.
Figure 2:
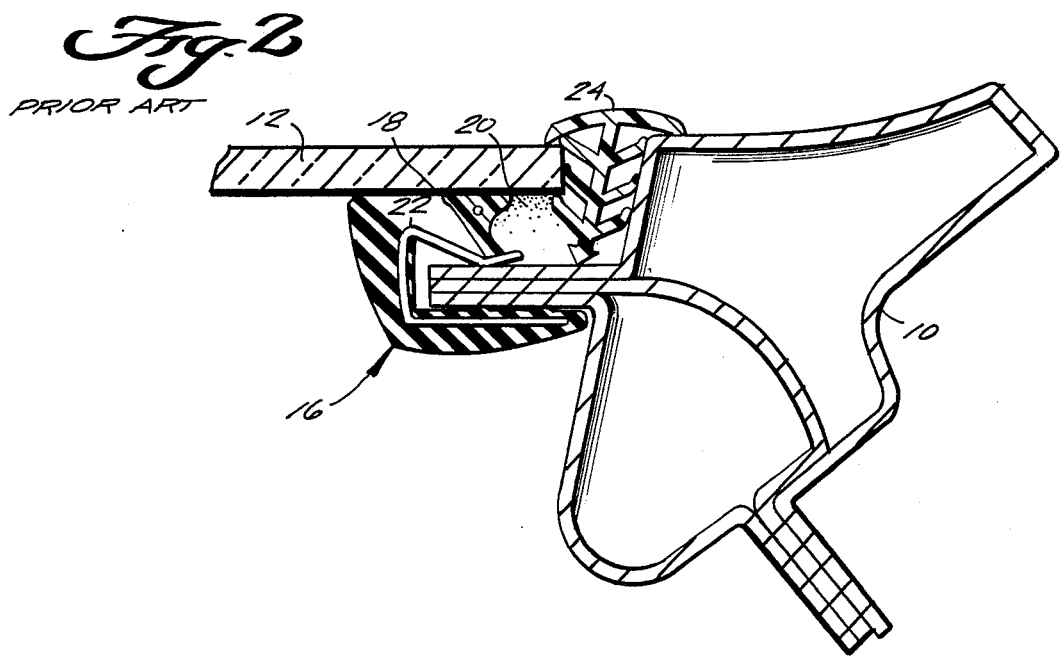
FIG. 2 is a final assembly drawing for the prior art assembly shown in FIG. 1.
Figure 6:
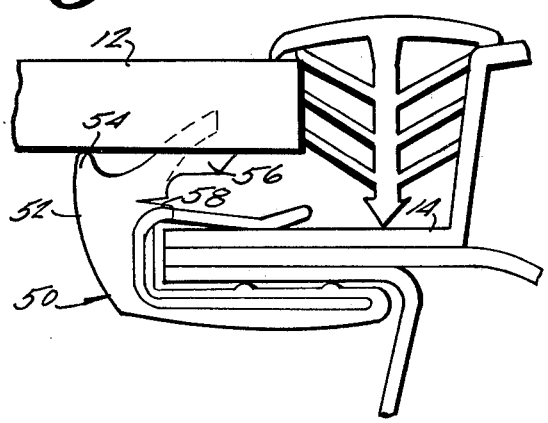
FIGS. 6–11 disclose alternative embodiments for the windshield trim made according to the present invention.

Turning attention first to FIGS. 1 and 2, a prior art approach to window installation is set forth. This structure is comprised of a vehicle body 10, windshield 12 and a flange 14 on which the windshield 12 will be supported. Windshield trim, generally indicated at 16, fits on flange 14, as shown in FIG. 2, and a separate dam member 18 is secured adjacent the marginal edge of window 12 by means of an appropriate adhesive. Dam 18 will be applied to window 12 at a separate processing station prior to the window arriving at the point at which it is going to be installed on the body 10 and if applied correctly, will be positioned as shown in FIG. 2 with respect to windshield trim 16. Prior to installation an adhesive, such as urethane adhesive 20, can be applied to the window between dam 18 and the edge of the window or conversely to the flange 14 on which the windshield 16 will be placed. By placing window 12 on flange 14, the urethane adhesive 20 will be pressed out and will flow against dam 18, through the reinforcing structure 22 of trim 16 and upwardly along the end of window 12. After placement of the window in this manner, Christmas tree trim 24 can be inserted between body 10 and the end of window 12 into the position as shown in FIG. 2 so that the marginal end of the window is completely enclosed by trims 16 and 24 with the urethane adhesive 20 occupying the cavity or chamber formed between those trims, window 12 and body 10.

As shown in FIG. 2, dam 18 has been properly positioned on window 12 and will allow window 12 to be correctly seated with respect to window trim 16. It will be evident, however, that if dam 18 is moved away from the marginal edge of window 12, the depending portion thereof will engage the raised outer portion of trim 16, thus, preventing window 12 from fully sealing into the cavity provided in body 10. When that occurs, the chamber for the adhesive formed between the window and the trim structures will be enlarged. The amount of adhesive applied to the window, as shown in FIG. 1, will normally be of a fixed volume so that if the volume of the chamber into which it is designed to flow is enlarged, proper sealing and bonding together of the parts will not occur. Also, it will be evident from FIG. 2 that as dam 18 moves away from the edge of window 12, its sealing edge will ride up upon the reinforcing structure 22, usually an open structure formed from wires, thereby allowing adhesive to flow beneath dam 18.

Turning our attention next to FIGS. 3 and 4, the numerals representing vehicle body 10, window 12, flange 14, adhesive 20 and Christmas tree trim 24 are repeated as these elements continue to be used with the present invention.

The trim produced according to the present invention, however, is generally indicated at 30. With reference to FIGS. 3-5 the trim is comprised of a main body portion 32, a bottom extension member 34, which extends away from the main body portion 32, two upstanding sealing ribs 36 and 38, which extend upwardly away from the main body portion 32 and a reinforcing member generally indicated at 40. Reinforcing member 40 is a continuous piece of metal, preferably wire, which is formed into a sinuous pattern which is thereafter bent or otherwise shaped into the U-shaped form shown in FIG. 5. In this form it is comprised of two horizontal legs 42 and 44 and a vertical, central portion 46. This wire reinforcing produces an open structure and, as will become clear, the present invention uses this structure more advantageously than the prior art to aid in locking the trim elements together thereby more securely holding the window in place.

The main body portion 32, ribs 36 and 38, and extension 34 are all made from a polymeric material, such as vinyl or rubber, and this entire structure is preferably formed as an extrusion. While still molten, the reinforcing member 40 is inserted, preferably within the extrusion head, so that as the polymeric material hardens, reinforcing member 40 will be securely held and embedded therein. The trim is made in the form of a continuous member and is subsequently cut into desired lengths prior to installation with the ends being abutted and suitably glued or otherwise bonded or held together. Since the construction techniques for extruding this trim and embedding the reinforcing member 40 therein are considered to be accomplished through conventional techniques, further description thereof is not deemed to be essential in order to provide a full, complete description of the present invention to one skilled in the art.

As shown in FIGS. 3 and 5, when window 12, of which only a portion is shown, is in its final position rib 36 will be deflected downwardly in a clockwise manner toward the cavity formed between window 12, trim 24 and flange 14. Rib 36, when unflexed, is higher than leg 38 and accordingly window 12 will intersect the top of rib 36 prior to the point where the adhesive material 20 is being fully pressed throughout the chamber. Thus, as the adhesive is forced throughout the chamber rib 36 performs the same function as dam 18 in the prior art structure. Rib 38, as shown in FIG. 5, forms the visual inner trim about the inner periphery of the window. While that is the principal function of that structure, the entire sealing portion of trim 30, as it contacts the window will help define the depth of insertion of the window within the body cavity.

Thus, ribs 36 and 38, respectively, provide interior and exterior seals; rib 36 controlling the flow of adhesive while rib 38 assures a tight exterior seal about the window and forms the interior and visible trim about the window. Because ribs 36 and 38 are integrally formed with trim 30, rib 36 will never be incorrectly positioned and rib 38 can assure the correct positioning on the window with respect to flange 14 so that the size of chamber created when the window is installed is consistent. Thus, if the amount of adhesive is kept uniform when applied, it will fully seal the entire area around the marginal edge of window 12. By placing ribs 36 and 38 in this manner, the adhesive can flow about the entire exposed interior surface of trim 30 including the area about the wires forming leg 42 making the bond between trim elements 30 and 24 more secure.

Thus, a one-piece, unitary structure has been designed which reduces the production steps necessary to install windows in vehicles. The present invention also reduces the likelihood of windows being misaligned when installed, eliminates the possibility that the visual appearance of the trim about the window will differ about its periphery by having portions of separately mounted dams appear at intervals and at the same time fully controls the flow of adhesive as the window is installed. Thus, the present invention retains the advantages of the prior art discussed herein while eliminating its disadvantages.

Turning attention next to FIGS. 6-11, a variety of a additional embodiments of the present invention are shown that could also be used to perform the sealing and trim tasks in a manner similar to the structure shown in FIG. 5. In each view, the uncompressed position of the rib members is shown by phantom lines, while the solid line representations show the trims as installed. With attention directed first to FIG. 6, the trim, generally indicated at 50, is provided with a main body portion 52 from which ribs 54 and 56 extend. The interior rib, 56, in its uncompressed condition again extends higher than the exterior rib, 54, and when window 12 is in place, rib 56 will be pressed inwardly, generally in a clockwise direction, and will act as a dam to control the flow of adhesive within the cavity formed between the glass and the vehicle body. Rib 56, when compressed, provides a relatively long, horizontal sealing surface against window 12 and to provide interior of body portion 52. In this embodiment as well, the exterior rib 54 provides the desired visual trim appearance about the periphery of the window and as before cooperates with the integrally formed inner rib to intersect the window when the latter is installed.

Figure 7:
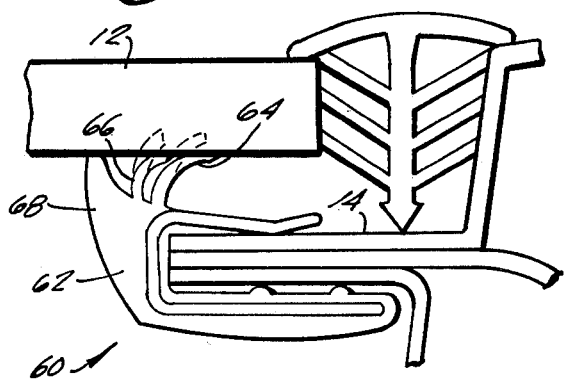

In FIG. 7, the trim, generally indicated at 60, is again provided with a main body portion 62 and is provided with a pair of inner ribs 64 and 66 and an exterior rib 68. Each of the interior ribs 64 and 66 are again compressed in a generally clockwise direction when the glass is in place, as shown in FIG. 7, and together they provide an inner seal to prevent adhesive flowing outwardly therebeyond along window 12. Exterior rib 68 again assures proper sealing about the interior periphery of the window and produces the exposed visual trim about the window.

Figure 8:
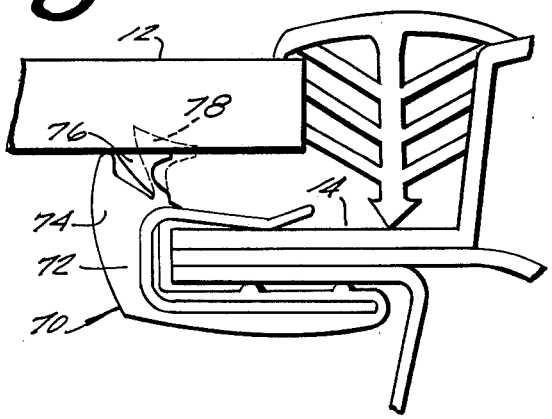

In FIG. 8, the trim member, generally indicated at 70, is again provided with a main body portion 72, an exterior rib 74 and an interior rib member 76 that is provided, in its uncompressed state, with a generally concave upper surface 78. As shown, that surface is compressed against the inner surface of window 12 when the window is installed and provides a relatively long, horizontal seal area to prevent the leakage of adhesive therepast. The exterior rib 74 again assures the proper sealing about the inner periphery of the window and again constitutes the portion of the trim that is visible when the window is installed.

Figure 9:
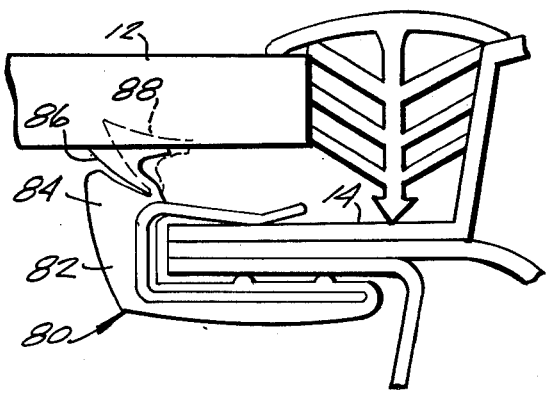

A modification of the embodiment shown in FIG. 8 is set forth in FIG. 9 where it is desired to have the window 12 located at a somewhat higher distance within the body cavity and away from flange 14. In this embodiment, the trim, generally indicated at 80, is again provided with a main body portion 82 and exterior rib 84 and an interior sealing rib 86. In this instance, once the window is installed, rib 86 flexes in a counterclockwise direction toward rib 84 in the upper portion of rib 84 determines the extent to which the flexing of rib 86 can reach. Further, it is the exterior rib portion of rib 86 that is visible once the window is installed, above rib 84, and again rib 86 is provided with a generally concave surface 88 prior to installation so that a relatively long seal is provided between that surface and the interior surface of window 12. The interior surface of rib 86 acts as the adhesive dam structure for controlling the flow of adhesive within the chamber between the trim members, the window and the vheicle body.

Figure 10:
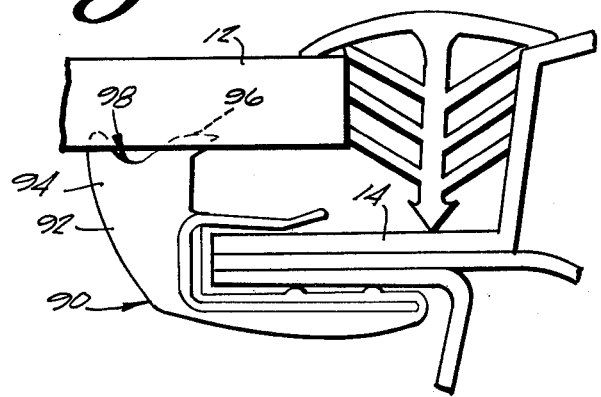

Turning next to FIG. 10, the trim, generally indicated at 90, is again provided with a main body portion 92, and upstanding ribs 94 and 96. In the other embodiments previously discussed, there has been a fair amount of fleixibility with respect to the interior ribs and, further, there has been a fairly wide separation between the upper portions of the inner and the outer ribs. With respect to the embodiment shown in FIG. 10, however, ribs 94 and 96 are separated only by a shallow depression 98 so that body portion 92 is enlarged in size. Accordingly, the flexibility of this joint is less and might provide a better seal and support of windows that exhibit heavier or larger dimensions. The trim, however, is made out of the same type of polymeric material and, accordingly, it is moldable to the window. Inner rib 96 again provides the same function as the other interior ribs discussed above to assure that the flow of adhesive material within the cavitity formed between window 12 and flange 14 is controlled and that no leakage will occur beyond that point. Likewise, exterior rib 94 forms the visual exterior of the trim about the interior periphery of the window.

Figure 11:
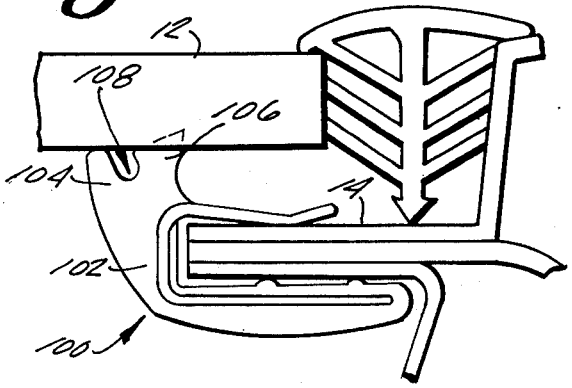

Turning, finally, to FIG. 11, the trim, generally indicated at 100, is again provided with a main body portion 102 from which ribs 104 and 106 extend in a upward direction. A larger channel 108 is provided between upstanding ribs 104 and 106 so that this embodiment is more flexible than that in FIG. 10. Rib 106 again functions to provide the internal dam required to control the flow of adhesive within the cavitity as the window is inserted in place and rib 104 provides the exterior visual effect of the trim about the window.

Thus, the present invention is comprised of a simple one-piece integrally formed trim member having a unique sealing structure that effectively seals the periphery of the window that in the past has required a multiplicity of elements. It provides a way to simply to produce an integral seal at the body flange rather than at the glass, thus, providing for a better and more uniformly achievable seal and one that will be correctly positioned to meet the window and form a seal regardless of window placement within the body cavity. In addition, the present invention eliminates the need for the use of a separately manufactured item as well as the separate mounting steps required to place that part on the window prior to placement. Each of the embodiments set forth and described herein assures that an interior portion of the sealing part of the trim structure operates correctly each time to control flow of adhesive within the cavitity produced between the window and the frame of the vehicle and helps to eliminate the possibility of problems resulting from slightly misaligned windshields.

The trim structure is preferably made of a flexible or polymeric material, such as thermoplastic material or rubber, either synthetic or natural. However, it should be understood that any polymeric material compatible for attachment to windshields, the adhesive being used, or which can be extruded easily in a conventional manner, such as vinyl, could be used. We prefer, however, that the durometer of the polymeric material range from 40A Rockwell to about 70D Rockwell. Also, while we prefer to have the polymeric portion of the trim member exhibit uniform hardness or resiliency, the portion in which the reinforcing wires is embedded could be comprised of a material of different flexibility. The dimensions of the ribs and trim profiles will vary in accordance with the requirements of the glass, the building height, the void or chamber size, as well as the amount of adhesive that is felt are desirable to use in any particular situation and, accordingly, may vary from installation to installation.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims, which scope is to be accorded the broadest interpretation so as to encompass all such modifications and equivalent structures.

What we claim is:

1. A method of installing windows in vehicles provided with body cavities for receiving windows and flanges therein for supporting such windows consisting of the step of placing an elongated trim provided with a pair of window engaging ribs onto the flange located within the body cavity in which the window is to be sealed so that the window engaging ribs face outwardly away from the body cavity, placing a bead of adhesive material about the periphery of the window, positioning the window within the body cavity, and pressing the window into contact with one of the two ribs while deflecting the other rib thereby forming said other rib into an internal dam for controlling the flow of the adhesive as the window is pressed into place thereby substantially preventing adhesive from flowing outwardly from the body cavity along the interior surface of the window and selaing between the outer peripheral edge of the window and the body cavity.

2. A method of installing windows in vehicles provided with body cavities for receiving windows and flanges therein for supporting such windows consisting of the steps of placing an elongated trim provided with a pair of inner and outer window engaging ribs onto the flange located within the body cavity in which the window is to be sealed so that the window engaging ribs face outwardly away from the body cavity, placing a bead of adhesive material about the periphery of the window or within the body cavity, moving the window into the body cavity until one side thereof engages the outer one of said ribs and while forcing the adhesive throughout the chamber defined between the trim, the body cavity and the periphery of the window, forming the interior one of ribs into an internal dam to control the flow of adhesive and substantially preventing it from leaking along the interior surface of the window and inserting molding along the edge of the window and into the adhesive.

3. A system for securing a window in a vehicle and for sealing the periphery thereof consisting of a body cavity formed in the vehicle, first trim means for providing an integral seal about the window in the body cavity and for engaging a portion of the body cavity, second trim means for enclosing the edge area between the periphery of the window and the body cavity and an adhesive composition for joining said first and second trim means together thereby securing the window in place within the body cavity and sealing the periphery thereof, wherein said first trim means includes an internal flexible sealing member having a concave surface facing the cavity at least when the window is inserted therein and a separate integrally formed exterior sealing member for forming an exterior seal about the window so that as the window is positioned in the body cavity the adhesive is forced through the remaining cavity space and said internal sealing member controls the movement of said adhesive composition thereby producing a tight seal about said window.

4. A system as in claim 3 wherein said interior and exterior sealing members cooperate together to define the insertion depth of the window within the body cavity.

5. An integral, elongated trim for use in sealing the periphery of windshields about a cavity provided in a vehicle body comprising an elastomeric member having reinforcing means for providing strength to the elastomeric member, said elastomeric member and said reinforcing means cooperating together to define a mounting groove for mounting the trim to the vehicle and first and second upstanding rib members for forming interior and exterior seals against the interior surface of the windshield about the periphery thereof wherein said first rib member is positioned adjacent the interior of the trim so that said first rib member forms the only interior seal adjacent that portion of the window adjacent said trim to control the flow of an adhesive when the window is installed on the vehicle and wherein the second rib member, positioned outwardly of said first rib member, forms the exterior trim about the periphery of the window with said first and second rib members acting together to define the depth of insertion of the window into the body cavity during window installation, wherein said first and second rib members are positioned substantially normally to said mounting groove.

6. An elongated trim as in claim 5 wherein at least said first and second members are comprised of an elastomeric material having a different hardness than the remaining portions of the elastomeric body.

7. A body trim for simultaneously providing both an esthetic external seal and an internal dam to control the flow of window adhesive within a cavity defined by a vehicle body opening consisting of an elastomeric body having an integrally molded clip means for retaining said body trim about said body opening, a first portion of said clip means being embedded within said elastomeric body and a second non-embedded portion being fully exposed within said cavity, said elastomeric body having a pair of integrally formed and spaced apart window engaging internal damming means and external sealing means, respectively, positioned outwardly of said second exposed portion, said internal damming means being positioned adjacent said second exposed portion and including a member angled so as to be flexible toward said second exposed portion, said external sealing means being positioned outwardly from said internal damming means and including a member angled so as to be flexible in a direction opposite to that of said internal damming means so that when said body trim is positioned around said body opening and the window is inserted therein, the said member included within said internal damming means is flexed inwardly to define a concave surface opening toward the cavity to control the flow of adhesive within the cavity and through said second exposed portion and said external sealing means forms an esthetic exterior trim in engagement with and extending about the window.

8. A window trim as in claim 7 wherein said internal and external flexible members are positioned substantially normal to the direction of said second non-embedded portion.

9. A window trim as in claim 7 wherein said clip means comprises a substantially U-shaped winding of reinforcing wire.

10. A window trim as in claim 7 wherein at least said pair of damming and sealing means are comprised of an elastomeric material.

11. A window trim as in claim 7 wherein said internal damming means is more flexible than the external sealing means.

12. A window trim as in claim 7 wherein a plurality of internal damming rib members are employed.

* * * * *